March 17, 1964    H. L. McCOMBS, JR    3,125,002
FLUID SERVO
Filed April 2, 1962
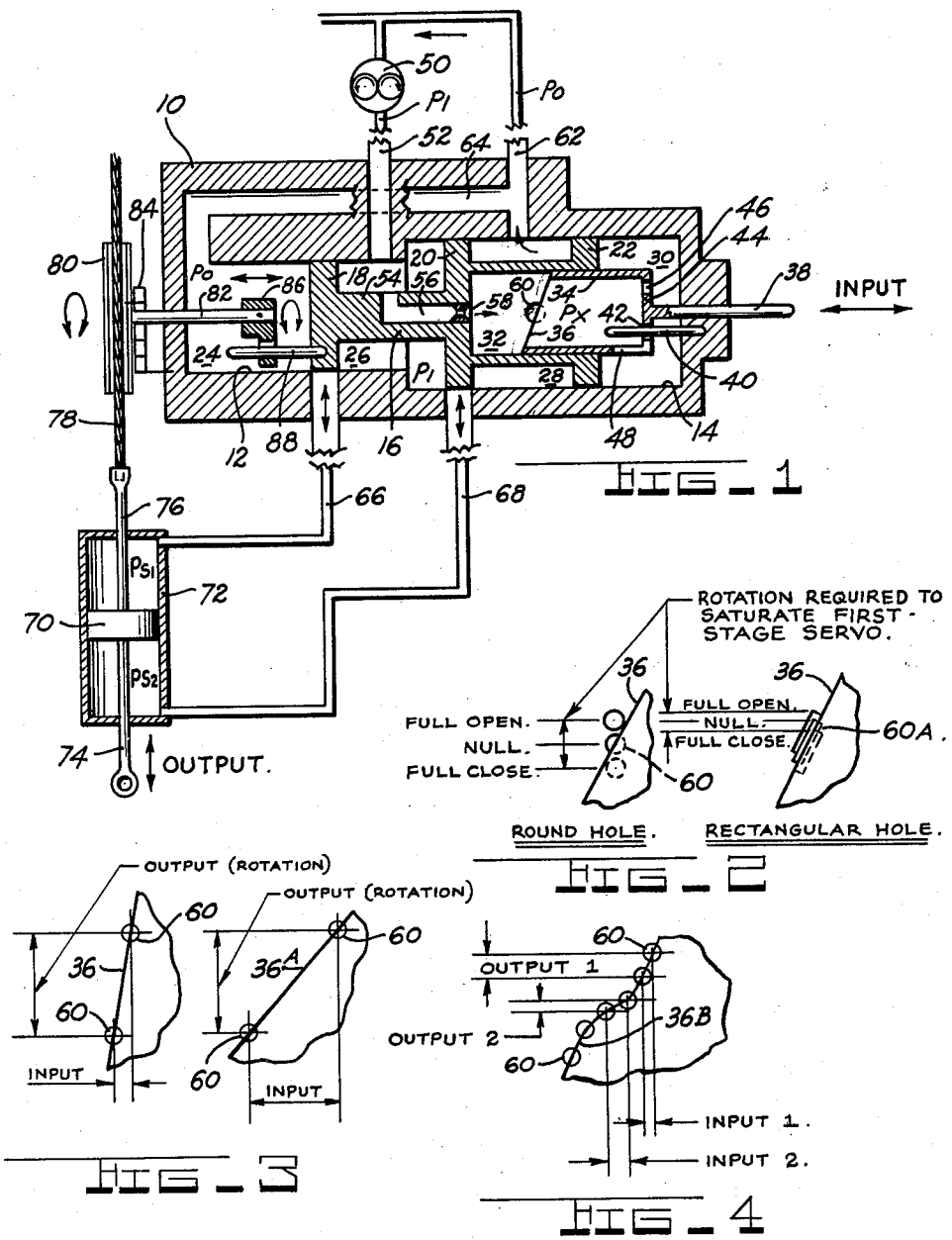
INVENTOR.
HOWARD L. McCOMBS JR.
BY
William S. Thompson
AGENT.

United States Patent Office 3,125,002
Patented Mar. 17, 1964

3,125,002
FLUID SERVO
Howard L. McCombs, Jr., South Bend, Ind., assignor to The Bendix Corporation, South Bend, Ind., a corporation of Delaware
Filed Apr. 2, 1962, Ser. No. 184,057
5 Claims. (Cl. 91—365)

The present invention relates to a fluid servo and more particularly to a fluid servo of the multiple stage feedback type for providing accurate input/output signal force and/or travel amplification.

It is an object of the present invention to provide a fluid servo of the multiple stage-feedback type of compact and simple construction.

It is another object of the present invention to provide a fluid servo of improved design capable of producing a variety of input/output relationships without the use of additional linkages, variable pivots, cams or such structure normally employed to achieve this object.

It is another object of the present invention to provide a fluid servo having an input control valve that serves as both a servo control valve and function changing cam member without use of extra parts.

It is another object of the present invention to provide a fluid servo having a relatively low propensity for sticking or clogging due to friction force or fluid borne impurities in the system.

Other objects and advantages of the present invention will become apparent from consideration of the attached description read in conjunction with the drawings wherein:

FIGURE 1 is a cross sectional view of a preferred form of my invention; and

FIGURES 2 through 4 show some alternate orifice patterns which may be used to alter the functional relationship between input/output signals.

Referring to FIGURE 1 my fluid servo comprises a housing member 10 having a first smaller diameter cylindrical bore 12 and a second larger diameter cylindrical bore 14 formed end to end in the interior. A first stage piston member 16 having a small diameter land 18 and two large diameter lands 20 and 22 is slidably arranged within the first and second housing bores, the relative size of the bores and lands being controlled to enable free sliding movement while preventing any significant fluid leakage past the piston lands. The disposition of piston 16 within bores 12 and 14 defines four subcompartments numbered from left to right as subcompartments 24, 26, 28 and 30 respectively. The right end of first stage piston 16 is cylindrically bored to provide a fifth subcompartment 32 which slidably receives input valve sleeve 34. The sleeve 34 is constructed so that one end 36 is cut angularly or spiral shaped. The right end of input valve sleeve 34 includes a rod 38 projecting externally of housing 10 to receive an input signal. An anti-rotating pin 40 is secured to housing 10 and extends through a hole 42 provided in an end wall 44 of sleeve 34 to prevent the rotation thereof. Additional vent holes 46 and 48 are provided in sleeve 34 to provide free communication of fluid between subcompartments 30 and 32. Control fluid at relatively high pressure $P_1$ is supplied to subcompartment 26 by pump 50 and conduit 52 from a source, not shown. First stage piston 16 includes a rod connection 54 between lands 18 and 20 having a passage 56 formed therein interconnecting subcompartments 26 and 32. A fixed size restriction 58 is provided in passage 58 to limit the fluid flow therethrough. A fluid control orifice 60 is formed in the sidewall of piston member 16 intermediate lands 20 and 22 and is in operative association with the angled end 36 of sleeve 34 to define a variable servo orifice in series with fixed restriction 58 such that the fluid pressure intermediate said restrictions, in compartments 30 and 32, may be controlled by movement of the end 36 of sleeve 34 relative to orifice 60. The controllable fluid pressure in compartments 30 and 32 is designated as $P_x$ pressure fluid. Fluid exhausting from orifice 60 flows through the annular compartment 28 through return conduit 62 back to the low pressure source or pump inlet and is designated as $P_0$ pressure fluid. $P_0$ pressure fluid is also transmitted by branch conduit 64 to subcompartment 24 where it acts on the left side of land 18.

Conduits 66 and 68 are connected to bores 12 and 14 respectively in housing 10 where they are controlled by lands 18 and 20. These conduits lead to opposing sides of second stage piston 70 enclosed in cylindrical housing 72. An output rod 74 movable with piston 70 extends externally from housing 72 where it is adapted to position any output device. Feedback rod 76 extends in like manner out the opposing side of housing 72 where it is attached to the flexible feedback cable 78. Cable 78 engages the periphery of sheave or pulley 80 mounted for rotation with the shaft 82 which extends within housing 10 in compartment 24. A torsion spring 84 is provided, anchored on one end to sheave 80 and on another end to housing 10 to provide a continuous tensile load on cable 78 to prevent buckling. A bell crank 86 is pinned on the end of shaft 82 within compartment 24. Bell crank 86 includes a pair of fingers, only one of which is shown in the section view, which extend on opposite sides of a rotation pin 88 pressed in the end of first stage piston 16. Pin 88 is offset from the center line of piston 16 to transmit rotary motion from crank 86, but this rotary connection does not impede translatory or longitudinal movement of piston 16.

First stage piston 16 is controlled axially in response to the fluid pressure forces acting thereon. If $A_1$ represents the cross sectional area of bore 12 and $A_2$ the cross sectional area of bore 14 then the force balance on piston 16 is:

$$P_0 A_1 + P_1(A_2 - A_1) = P_x A_2$$

or $$P_x = P_1 - P_1 \frac{A_1}{A_2} + P_0 \frac{A_1}{A_2}$$

For any given area ratio designed into the piston there is one $P_x$ pressure which will exactly balance the forces on the piston so that no movement results. This balance value of $P_x$ is identified as $P_n$ or "null" pressure. If, for example, the area of bore 14 was twice that of bore 12 so that $A_1/A_2 = \frac{1}{2}$, then $$P_x \text{ (or } P_n) = \frac{P_1}{2} + \frac{P_0}{2}$$

which is the average value of $P_1$ and $P_0$ pressures. If $P_x$ is made greater than the "null" value $P_n$ piston 16 will be exposed to a pressure unbalance moving it to the left whereas rightward movement would result when $P_x$ is less than $P_n$.

The operation of my device may be described as follows. The device as illustrated in FIGURE 1 is shown in its stable or no movement position. The size of orifice 60 is controlled by the angled end of sleeve 34 so that $P_x$ pressure will be at its null value $P_n$ and the fluid pressures acting on piston 16 are in balance. Lands 18 and 20 are covering equally the openings of second stage conduits 66 and 68 so that equal pressure is maintained on opposite sides of second stage piston 70 which is thus maintained motionless. If now the input rod 38 is moved to the left, positioning sleeve 34 to the left, the angled or spiral edge 36 will close orifice 60 raising $P_x$ pressure above its null value. First stage piston 16 will thus move to the left opening conduit 66 to high pressure $P_1$ fluid in compartment 26 and opening conduit 68 to low pressure fluid $P_0$ in compartment 28 creating a pressure differential across second stage piston 70 tending to move it downwardly. As piston 70 moves downwardly, it rotates sheave 80 clockwise, as viewed from the sheave end. Rotary movement of sheave 80 is transmitted via shaft 82, bell crank 86 and rotation pin 88 to first stage piston 16 which moves orifice 60 upwardly with respect to the angled edge 36 of sleeve 34. As orifice 60 moves upwardly, actually rotationally, in an uncovering direction, $P_x$ pressure is caused to decrease moving piston 16 to the right. This action will continue, i.e., combined rotational and translatory movement of piston 16, until lands 18 and 20 again cover the openings of conduits 66 and 68 when stable or non-movement system operation is again achieved.

Moving the input rod 38 to the right would, of course, reverse to sequence of the events just described causing initial rightward movement of first stage piston 16, upward movement of second stage piston 70 and counterclockwise rotation of piston 16 viewed from the sheave end with combined leftward movement until the stable position is again obtained.

FIGURE 2 illustrates the effect of changing the shape of orifice 60 from circular to rectangular or other shape. This figure shows the degree of rotation required to move the circular orifice 60 from full open to null and then to the full closed position. This is to be compared with the lesser total movement of rectangular orifice 60A for the corresponding three positions. The total range of movement should be held down for fast acting systems. It is contemplated that various hole shapes are within the scope of the present invention and should be selected to obtain the response rate required.

FIGURE 3 illustrates the relationship of the input to the output (gain) as being proportional to the slope or spiral of the input sleeve. Edge 36 has a relatively shallow slope and for a given input motion produces a large output movement. Edge 36A has a steeper slope where the input/output gain more closely approaches unity. As can be seen, the system gain may be readily controlled by the angle of edge 36.

FIGURE 4 illustrates a means for providing a non-linear relationship between input and output by constructing the edge 36B to have a given non-linear contour. With this relationship the gain at different portions of the travel range may be varied from that in other portions of the travel range. In this embodiment, edge 36B acts as a combined valve and non-linear cam.

For those skilled in the art, it will be readily apparent that my invention is not limited to a translatory input and output shown in the preferred form of the invention. By removing anti-rotation pin 40 and fixing the position of sleeve 34 in an axial sense, a rotary input may be conveniently applied. Also a rotary output could be taken from sheave 80 or other separate rotary system driven by output rod 74.

Although the invention has been described in conjunction with a particular embodiment, it will be understood by those skilled in the art that numerous modifications and changes may be made in the example given without departing from the underlying principles of the invention.

I claim:

1. A multiple stage fluid servo comprising: a housing defining an interior cylindrical chamber, a first stage piston member slidably arranged in said chamber, a cylindrical bore formed in one end of said first stage piston member, means supplying pressurized control fluid to opposing sides of said first stage piston member, a servo control orifice formed in the sidewall of said first stage piston within said cylindrical bore, a cylindrically formed input valve sleeve slidably disposed in said cylindrical bore of said first stage piston member, said input valve sleeve having an angled edge operative with said servo control orifice to control the effective area thereof and thereby control the fluid pressure positioning said first stage piston member, said input valve sleeve including a member secured thereto and extending externally of said housing member for receiving an input signal, a second stage piston device located externally of said housing member, conduit means supplying a controlling fluid pressure to said second stage piston from within said housing, valve land means secured to said first stage piston and movable therewith operative to control the fluid pressure transmitted by said conduit means to said second stage piston in response to axial movement of said first stage piston, rotary feedback means connected between said first and second stage pistons operative to rotate said first stage piston in response to axial movement of said second stage piston and thereby affect the effective area of said servo control orifice as controlled by said angled edge of said input valve sleeve.

2. A multiple stage fluid servo as claimed in claim 1 wherein said feedback means is comprised of a flexible cable secured to said second stage piston and a rotatable sheave drivably connected to said first stage piston and said flexible cable.

3. A multiple stage fluid servo as claimed in claim 1 wherein said conduit means comprises a pair of conduits connecting opposed sides of said second stage piston to the interior cylindrical chamber of said housing, and said valve land means comprising a pair of lands formed on said first stage piston each operative with one of said pair of conduits to control the fluid pressure supplied thereto.

4. A multiple stage servo comprising: a first stage piston movable axially and rotationally, means supplying control fluid pressure to said first stage piston for controlling the axial movement thereof, a control orifice formed in a sidewall of said first stage piston operative to control the fluid pressure positioning said first stage piston axially, said control orifice being movable axially and in a circumferential path with axial and rotational movement respectively of said first stage piston, a cylindrically formed input member movable in response to an input signal and having an angled end operative to control the effective area of said control orifice when said input member and said control orifice are moved relatively in axial or rotational directions, a second stage piston member responsive to fluid pressure, valve control means controllable in response to axial movement of said first stage piston to control the fluid pressure acting on said second stage piston, and feedback means interconnecting said first and second stage pistons operative to rotate said first stage piston in response to movement of said second stage piston.

5. A multiple stage servo comprising: first and second stage piston members, means interconnecting said pistons to position said second piston axially in response to axial movement of said first stage piston and to position said first stage piston rotationally in response to axial movement of said second stage piston, fluid control means operative to control the axial position of said first stage piston including a controllable servo orifice movable axially and circumferentially with axial and rotational movement respectively of said first stage piston member, an input valve member having an angled end operative with said controllable servo orifice to control the effective area thereof in response to relative movement between said input valve member and said servo control orifice.

References Cited in the file of this patent

UNITED STATES PATENTS 2,503,447    May  ---------------- Apr. 11, 1950
2,787,253    Boothe  -------------- Apr. 2, 1957